Inventor
ANTHONY J. HORNFECK

INVENTOR.
ANTHONY J. HORNFECK
BY
ATTORNEY

Inventor
ANTHONY J. HORNFECK
By Raymond D. Jenkins
Attorney

Sept. 15, 1953  A. J. HORNFECK  2,652,524
ANTIHUNT ELECTRICAL MEASURING SYSTEM
Original Filed Oct. 18, 1943  5 Sheets-Sheet 5

Inventor
ANTHONY J. HORNFECK
By Raymond D. Junkins
Attorney

Patented Sept. 15, 1953

2,652,524

UNITED STATES PATENT OFFICE 2,652,524

ANTIHUNT ELECTRICAL MEASURING SYSTEM

Anthony J. Hornfeck, Lyndhurst, Ohio, assignor to Bailey Meter Company, a corporation of Delaware Original application October 18, 1943, Serial No. 506,632. Divided and this application May 18, 1949, Serial No. 93,870

6 Claims. (Cl. 318—28)

This invention relates to a system for measuring and/or controlling the magnitude of a variable, such as temperature, pressure, rate of fluid flow, position or displacement, although the variable may be of any chemical, physical, electrical, thermal or other characteristic.

In accordance with my invention variations in a variable quantity, quality or condition are translated into variations in an electrical effect, and this effect is then amplified solely through electrical means until sufficient power is available for doing useful work, such as moving an indicator or other exhibiting means, or for regulating the rate of application of an agent contributing to the production or maintenance of the variable.

In devices of the same general type at present known wherein variations in the variable are translated into variations in an electrical effect the necessary amplification is done, at least in part, by mechanical means. There are, therefore, variations in magnitude of the variable translated into variations in an electrical effect which is then translated into a corresponding mechanical movement, such as the deflection of a galvanometer, and thence usually the mechanical movement is translated back into an electrical effect for operating the exhibiting or control device. Because of the small power available in the first electrical effect such devices usually operate on a periodic or step by step principle. That is to say, upon a change in the variable the exhibiting or control device is not continuously operated in correspondence with such change or changes, but periodically by means of a feeler mechanism an exhibiting or control device is changed an amount corresponding to the amount of change in the variable during succeeding increments of time. Such step by step and feeler mechanisms are well known in the art.

It is evident that such devices are necessarily complicated and delicate and do not correctly exhibit the variable during transient periods. My invention is particularly concerned with the elimination of all mechanical movements between the sensitive device and the exhibiting or control device, leading to simplification and removal of the usual time delay, so that the device accurately exhibits the magnitude of the variable even during transient periods. It is evident that many ancillary advantages will follow, among which may be mentioned as obvious the elimination of wear of mechanical parts and the elimination of the necessity of periodic inspection and adjustment to correct for inaccuracies occasioned by mechanical wear.

The great majority of low level D.-C. measuring systems, such as thermocouple potentiometer recorders, use a galvanometer for detecting or measuring the D.-C. input. The galvanometer is a relatively fragile device and is affected by mechanical vibration and easily damaged by overload or mishandling. Vacuum tube or electron amplifiers for low D.-C. voltages have not been successful because of instability and drift. A particular object of the present invention is to provide apparatus and a new method of detecting and amplifying small D.-C. voltages or currents. The present method involves the use of a device (which I term a reactor converter) which converts a D.-C. signal of reversing polarity into a greatly amplified A.-C. signal of reversing phase. The apparatus includes a pair of iron core reactors and has all of the sensitivity of a galvanometer as well as the sturdiness of a transformer. There are no delicate moving mechanical parts to wear out or to be damaged.

The reactor converter produces a greatly amplified A.-C. output signal of reversing phase which is supplied to a phase sensitive electronic amplifier and motor control circuit. In this way a thermocouple, having an output of only a few millivolts, is used to position a reversing motor with no intermediate mechanical or moving parts. The reversing motor may position an indicator or recorder and at the same time a potentiometer for balancing the system, which may be of the null type.

A particular object of my present invention is in the provision of an anti-hunt electrical measuring system.

This application constitutes a division of my copending application Serial No. 506,632, filed October 18, 1943, now Patent 2,494,876, dated January 17, 1950, to which reference may be had for a more detailed description of the circuit to which my present invention is applied.

Figure 1:
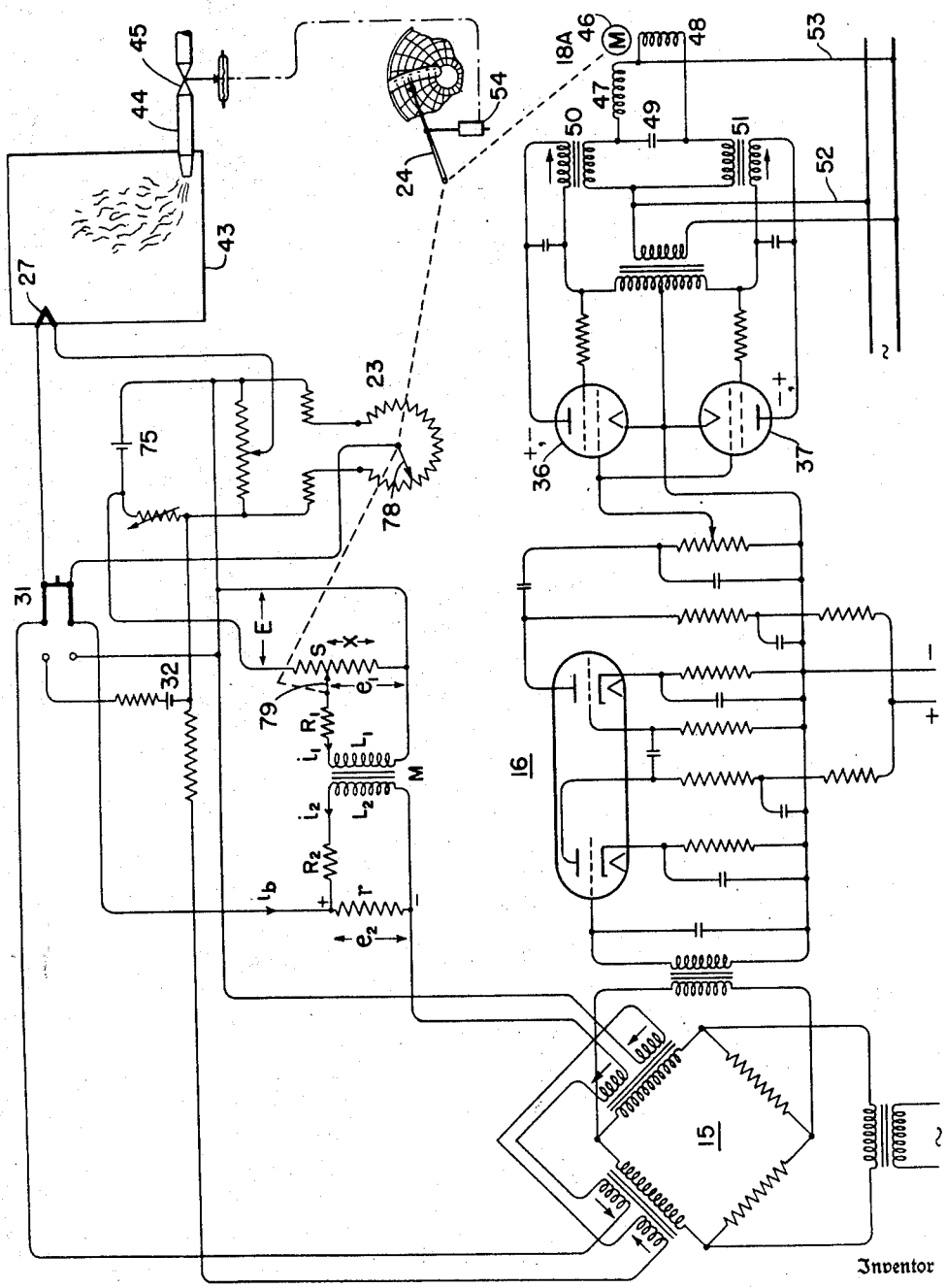
Fig. 1 is a wiring diagram including speed voltage feed-back from an auxiliary slidewire.

Fig. 1 is a diagrammatic representation of a high speed direct current recorder circuit using a speed-voltage feed back from an auxiliary slidewire. A thermocouple 27 is sensitive to the temperature of the furnace 43 supplied with fuel for combustion through a pipe 44 under the control of a regulating valve 45. The basic measuring circuit for the thermocouple 27 is described in my copending application Serial No. 453,486, now Patent 2,529,450, dated November 7, 1950, and includes a reactor-converter 15 and amplifier 16 for controlling a reversing motor 18A which is adapted to position a recording pen 24.

In general the action of the reactor-converter 15 is one of changing a direct current signal of given polarity into a greatly amplified alternating signal of given phase; and the ability of reversing the phase of the alternating current signal 180° when the polarity or sign of the direct current signal is reversed.

In a circuit of this general type difficulty may be encountered because of the motor hunting about the balancing point. This instability may be caused by the inductive time lag in the reactor unit which produces an inertia or fly-wheel effect. In my copending application I provide a feed-back to the D.-C. input circuit in such a direction as to oppose the input. The effect of this feed-back is to decrease the time lag in the converter and to produce a momentary shift in the zero input point so that the D.-C. input circuit will be balanced before the true balance is reached.

The anti-hunt circuit of Fig. 1 comprises broadly an inductive coupling device M whose primary is supplied with variable direct current from the potentiometer circuit source 75 and whose secondary provides a feed-back to the input direct current saturating winding of the reactor-converter 15. Current and voltage in the primary circuit is controlled by the position of a contact arm 79 along a slidewire S; said contact arm positioned by the motor 18A along with the slidewire contact 23, the indicator 24, and pilot 54.

The inductive coupling device M is in construction in the nature of a coupling transformer, although it is inductively coupling two direct current circuits. The arrangement is such that when the voltage and current in the primary circuit is varied (by the motor 18A) the voltage and current in the output circuit is also varied. In a steady state there is no inductive transfer effect between the primary and secondary. In other words, a variation in the secondary circuit is produced only upon change in voltage or current of the primary, is therefore proportional to rate of change in the primary, and consequently proportional to rate of speed of the motor 18A.

The secondary voltage developed by the coupling device M is proportional to the speed at which the motor 18A is positioning the slidewire contact S. A portion of this speed voltage is supplied in opposition to the unbalanced voltage developed in the thermocouple-potentiometer circuit. The effect is to produce a dynamic or running balance point ahead of the true static balance point. This tends to slow down or temporarily stop the motor so as to prevent overshooting and hunting and permits much faster speed than would otherwise be possible.

Figure 2:
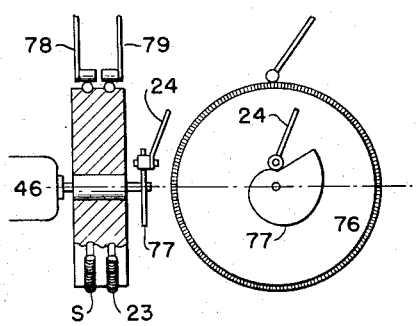
Fig. 2 illustrates a slidewire assembly.

An auxiliary slidewire S, which may be mounted on the same hub as the measuring slidewire 23, is supplied with direct current voltage from the source 75. The voltage then supplied to the primary of the coupling device M depends upon the position of the contact 79 relative to the slidewire S, while the secondary voltage is proportional to the rate of change of contact position; consequently is proportional to the motor speed. Such an arrangement of slidewires is illustrated in Fig. 2 wherein the motor rotor 46 may be provided with necessary gear reduction and drives an insulating hub 76 carrying on its periphery the slidewires S and 23; as well as a cam 77. The indicator arm 24 may be positioned from the cam 77, while contacts 78, 79 engage the movable slidewires 23 and S respectively.

The action of this speed voltage feed-back may be mathematically explained as follows:

$$e_1 = ESx = i_1 R_1 + L_1 \frac{di_1}{dt} - M \frac{di_2}{dt} \quad (1)$$

and $$0 = i_2 R_2 + L_2 \frac{di_2}{dt} - M \frac{di_1}{dt} \quad (2)$$

If $R_1$ is large compared with $L_1$ and $M$, the voltages $$L_1 \frac{di_1}{dt}$$

and $$M \frac{di_2}{dt}$$

will be small compared to $i_1 R_1$. Hence by Equation 1:

$$i_1 = \frac{ESx}{R_1}$$

and $$\frac{di_1}{dt} = \frac{(ES)}{(R_1)} \frac{dx}{dt} \quad (3)$$

Substituting for $$\frac{di_1}{dt}$$

in Equation 2 yields $$i_2 R_2 = M \frac{ES}{R_1} \frac{dx}{dt}$$

or $$i_2 = \frac{(MES)}{(R_1 R_2)} \frac{dx}{dt} = \text{a constant} \times \text{positioning speed}$$

and $$e_2 = i_2 r = \text{a constant} \times \text{speed}$$

Figure 4:
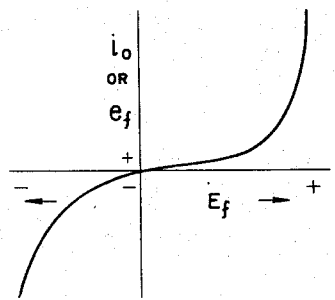
Fig. 4 is a graph in connection with Fig. 3.
Figure 3:
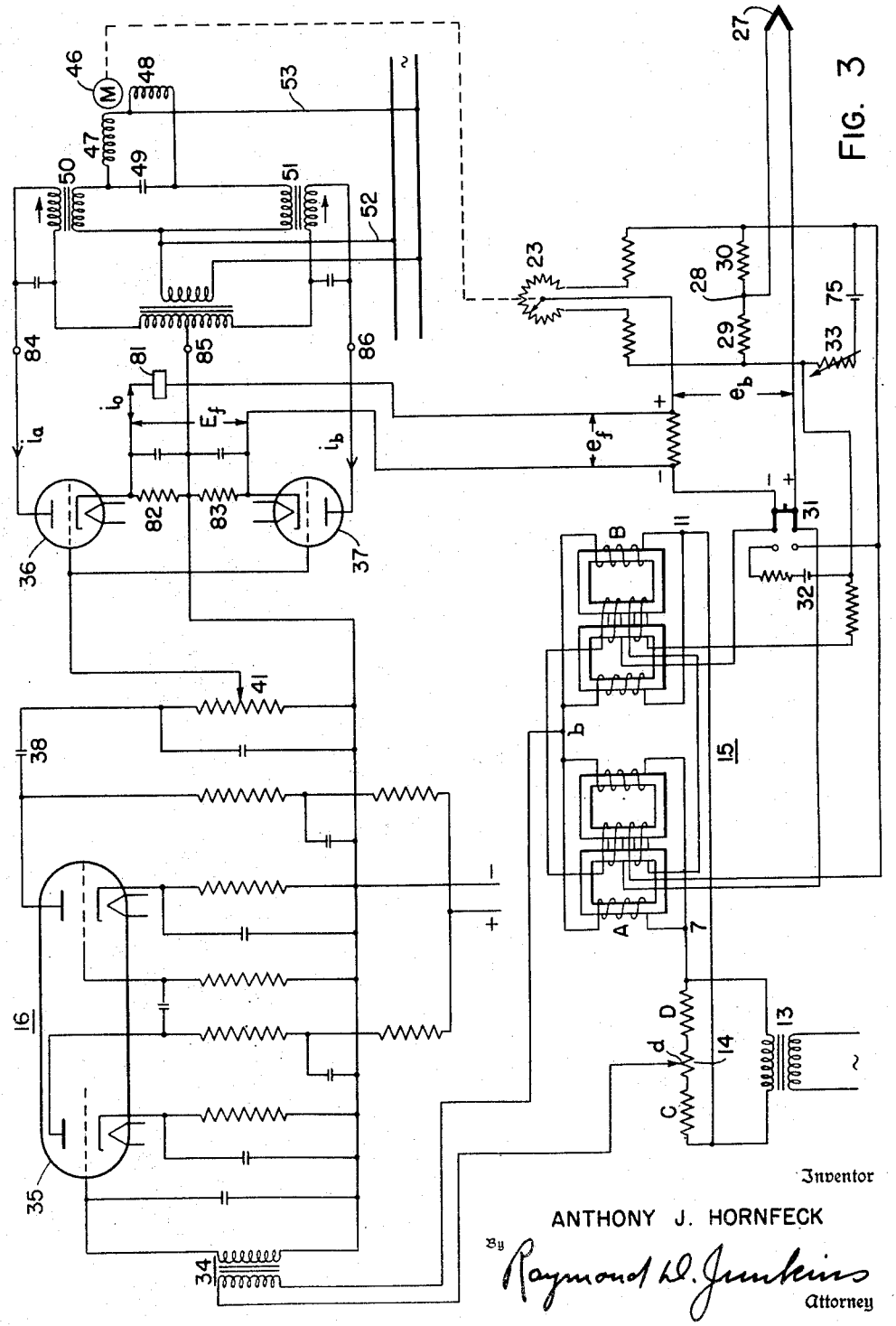
Fig. 3 illustrates a D.-C. measuring circuit with non-linear inverse feed-back.

In Fig. 3 I illustrate a direct current measuring system such as shown in Fig. 4 of the aforementioned Patent 2,529,450 but additionally including a non-linear inverse feed-back. The purpose of this circuit is to limit the build-up of the unbalanced current (or voltage) supplied from the potentiometer measuring circuit to the reactor converter 15. This is to prevent a shift in the null point or possible damage to the reactor converter caused by a rapid and large change. The feed-back also has the effect of increasing the stability of the system.

A non-linear resistor 81 may be of the silicon carbide type which has a very high resistance when low voltage is applied across it, but whose resistance decreases at a very rapid rate as the voltage is increased. For small changes the feed-back will be negligible and no appreciable reduction in sensitivity will result. For larger changes the feed-back will become much greater and will limit the input current to the converter to a safe value, since the voltage $e_f$ is always in such a direction as to oppose the input. Fig. 4 expresses this graphically.

Figure 6:
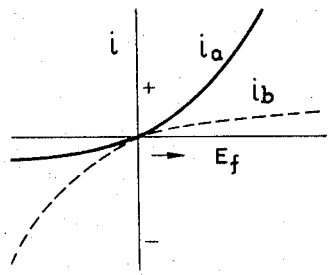
Figs. 6 and 7 are graphs in connection with Fig. 5.
Figure 5:
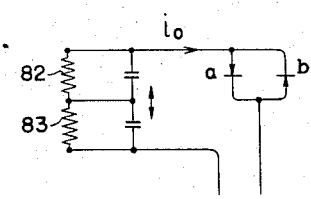
Fig. 5 shows a modification of Fig. 3.
Figure 7:
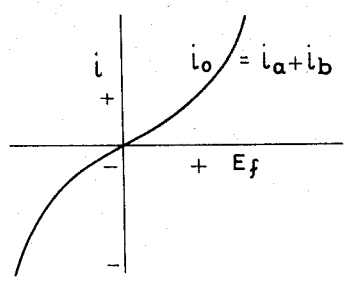

Copper oxide or a similar type of polarizing resistor may be used in place of silicon carbide. To make such a unit independent of polarity it is necessary to use two components as graphically indicated in Figs. 5, 6 and 7.

Figure 8:
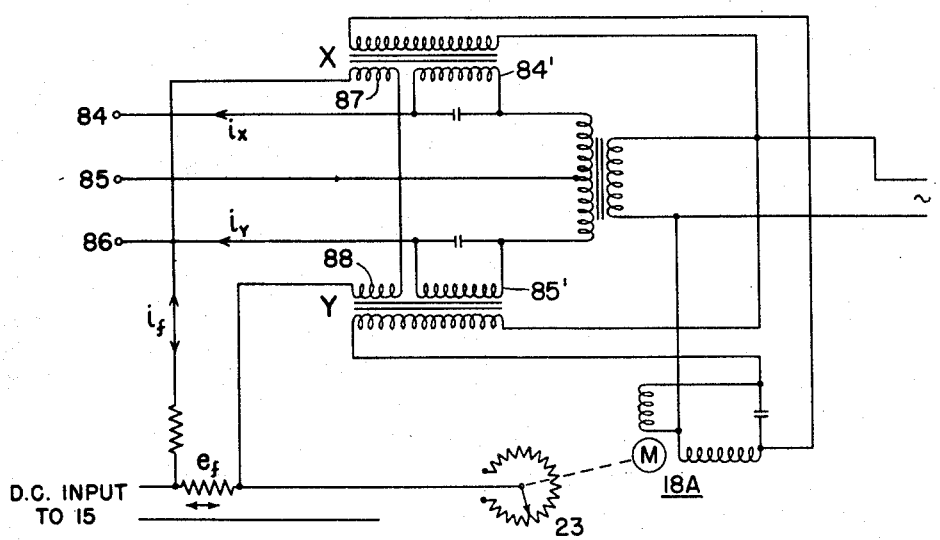
Fig. 8 illustrates a portion of the circuit of a D.-C. measuring system embodying a stabilizing feed-back from motor control reactors.

Fig. 8 represents a further embodiment of my invention in connection with a part of a complete circuit. For example, referring to Fig. 3, I have indicated terminals 84, 85, 86 between the motor control tubes and the saturable reactor control of the capacitor-run motor 18A. In Fig. 8 I omit, for the sake of simplicity, a duplication of the potentiometer circuit as well as the reactor converter 15 and amplifier 16. I show a feed-back arrangement to the D.-C. input of the reactor converter 15 from the saturable core reactors which are controlling the motor 18A responsive to an amplifier 16 and motor control tubes 36, 37.

To this circuit has been added a stabilizing feed-back including two coils 87, 88 wound around the center leg of the motor control reactors 50 and 51 in addition to the saturating D.-C. winding 84' or 85'. These coils 87, 88 carry direct current and are connected in series so that the induced voltages are additive. A portion of this total voltage is applied to the input circuit in such a direction as to accelerate the change. Assuming that reactor X is saturated and that the motor is driving the potentiometer contact to balance from one direction. The D.-C. current in X will begin to decrease as the input to the reactor converter decreases while the D.-C. current in Y will begin to increase. This change of current in X and Y will induce voltages in the windings 87, 88 of X and Y in accordance with the equation:

$$E = -M\frac{di}{dt}$$

where M is the mutual inductance and $i$ is the D.-C. current.

The total voltage applied to the input circuit will be proportional to the sum of the two induced voltages:

$$e_f = -K\left(M\frac{di_a}{dt} + M\frac{di_b}{dt}\right)$$

and will oppose the original unbalance from the measuring circuit. This will tend to slow down or stop the motor before the true balance is reached and will prevent excessive overshooting or hunting. On the other hand, if the system is assumed to be in balance and a small change in the D.-C. input voltage occurs, the induced voltage will be in such a direction as to supply a feed-back voltage which will aid the original unbalance. This will accelerate the motor faster than would otherwise occur and the speed of response of the system will be increased.

The arrangement is similar in theory to that described in connection with the inductive coupling device M of Fig. 1. Winding 84' carries direct current saturating control from the amplifier. Winding 87 normally carries no current. Upon change in direct current value through the winding 84' there is induced in the winding 87 a direct current whose magnitude and polarity is determined by the direction and magnitude of change in the voltage through the winding 84'. Under a steady state of voltage in the winding 84' there is no direct current voltage in the winding 87. It is only upon change in voltage in the winding 84' that a voltage is induced in the winding 87, and it is induced in a direction depending upon the direction of change, i. e. whether the voltage in 84' has increased or decreased. The magnitude of the induced voltage in the winding 87 is determined by the rate of change in voltage in the winding 84'.

The direct current voltages in the circuit including the windings 87, 88 in series are additive. When the motor 18A is to be rotated, then the saturating current in winding 84' will increase (for example) while the saturating direct current in the winding 85' decreases. The increase in saturating voltage in 84' produces a voltage in 87, while the decrease in saturating current in 85' produces a voltage in winding 88.

Figure 9:
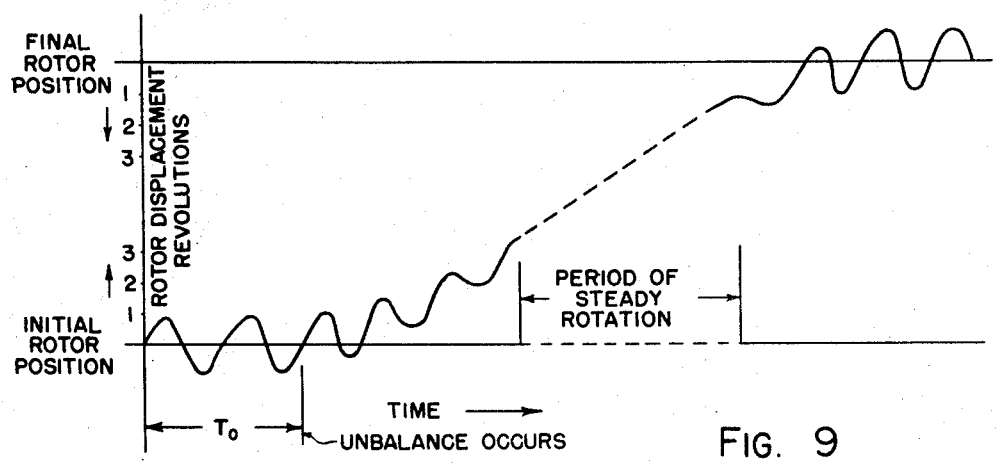
Fig. 9 is a graph of operation in connection with Fig. 8.
Figure 10:
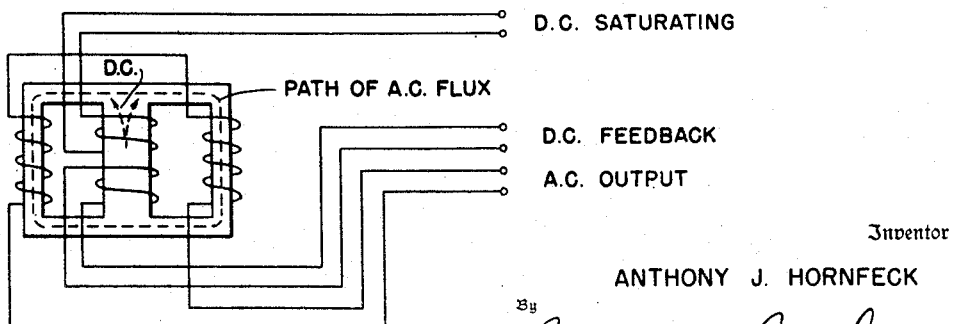
Fig. 10 shows a saturable core reactor construction for Fig. 8.

It will be noted that this feed-back couples the output circuit with the input circuit in a regenerative fashion somewhat similar to certain types of vacuum tube oscillators. If the feed-back voltage is of sufficient magnitude, self-oscillations can be induced in the system which will keep the motor constantly in oscillation even at balance conditions. By proper adjustment this oscillation can be held at a small enough amplitude so as to just take up the backlash in the gears and not enough to cause any motion of the potentiometer contact arm on the slidewire. By keeping the motor rotor quivering constantly the sensitivity of the system is greatly increased, since static friction of the motor bearing does not have to be overcome before the motor begins to position the potentiometer slidewire. The slightest unbalance of the measuring circuit will unbalance the rotor oscillations so that there will be an average motion of the potentiometer slidewire to rebalance the system. This action is clearly shown in Fig. 9. The construction of the saturable core reactor X (or reactor Y) may be as illustrated in Fig. 10 comprising a three legged core having the A.-C. output winding comprising two coils on the outer leg connected in series and with the D.-C. input coil 84' and the feed-back coil 87 on the center leg.

Figure 11:
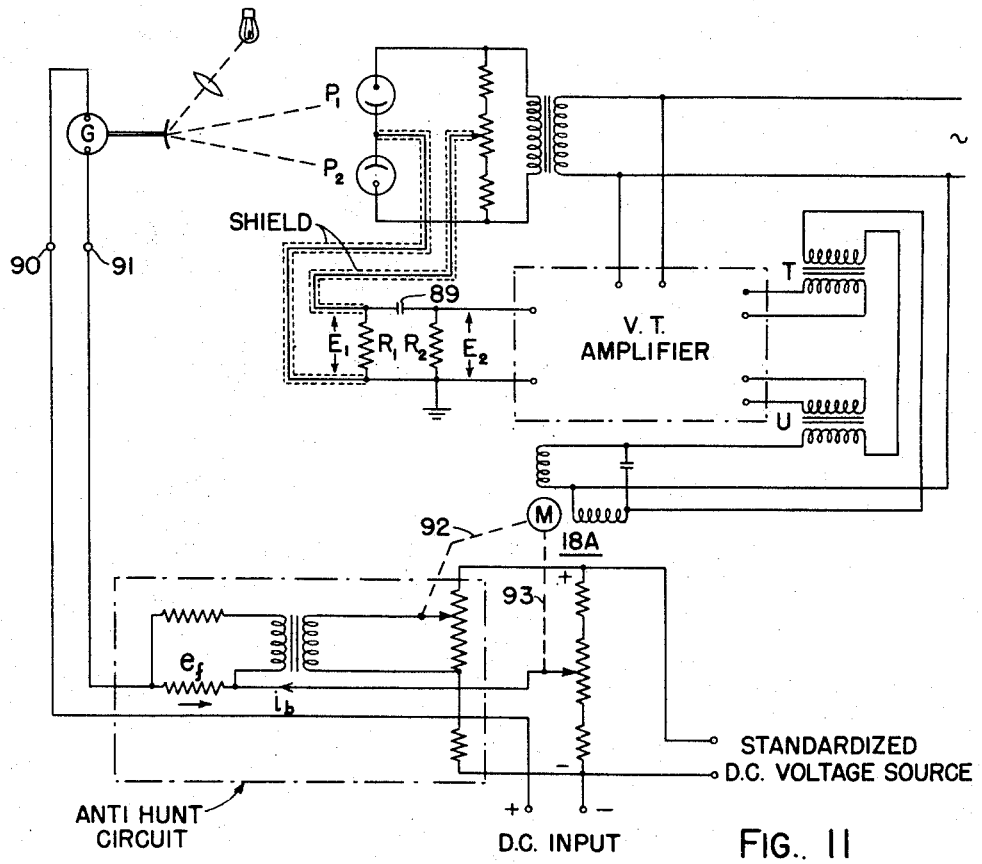
Fig. 11 illustrates a D.-C. measuring system using photoelectric-galvanometer converter with speed voltage feed-back from an auxiliary slidewire.

The feed-back circuits illustrated in Figs. 1–10 inclusive, and described in connection therewith, are not limited to use in connection with the reactor converter 15. Fig. 11 shows a circuit using a vacuum tube amplifier, motor control circuit and feed-back system such as is shown in Fig. 1 but employing a photosensitive A.-C.-D.-C. converter.

Referring to Fig. 11, at balance equal light falls on the photo tubes $P_1$ and $P_2$ so that the bridge circuit (of which these tubes are a part) is balanced. $E_1$ and $E_2$ are zero and the motor remains stationary. If a change in D.-C. input occurs the measuring circuit becomes temporarily unbalanced and a voltage input to the galvanometer G causes its mirror to deflect. As a result the light falling on the photo tubes is unbalanced and a pulsating voltage appears across the output resistor $R_1$. Since the vacuum tube amplifier is coupled through the condenser 89 only the alternating component of the pulsating voltage $E_1$ will appear across $R_2$. This voltage is amplified and selectively controls reactors T and U to cause the motor 18a to rotate and rebalance the measuring circuit. Here, as in Fig. 1, I provide a direct current measuring system incorporating speed voltage feed-back from an auxiliary slidewire and in connection with a photoelectric-galvanometer converter.

I have not felt it necessary to further complicate the drawings by duplicating the indicating or recording mechanism in the later described figures, although it will be appreciated that a primary purpose of the circuit is to measure and provide a visual indication, as well as perhaps a permanent record, of the temperature or other variable which has produced the direct current, or change in direct current, which is to be measured. Furthermore, of course the motors 18 and 18a may be used to control as has been described in connection with earlier figures of the drawing. Furthermore, the circuit arrangements are not limited to the use of the capacitor-run type of motor, but may be equally as well adapted to opposed field motors, direct current motors, shaded pole motors, etc. The principal feature, however, of this application lies in the anti-hunting feed-back circuits which are useful in numerous measuring or controlling total circuits.

Figure 12:
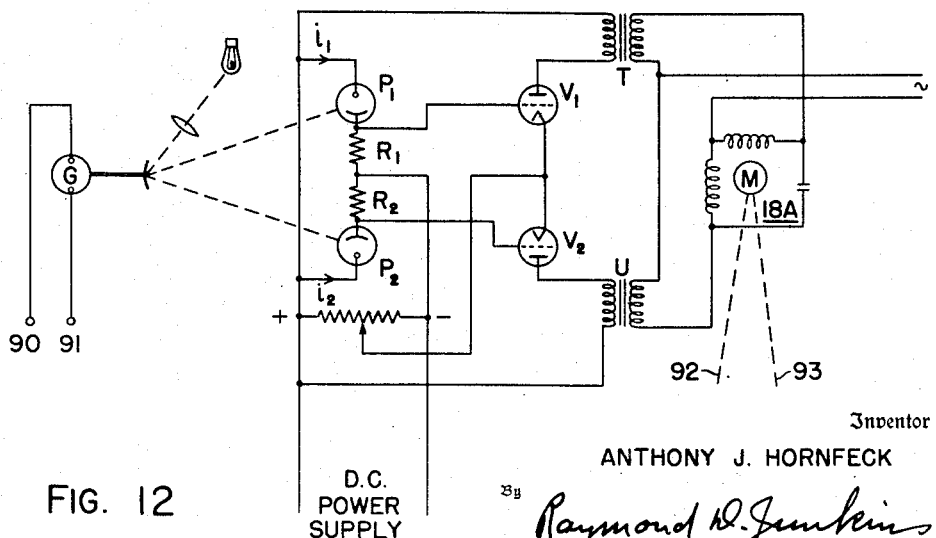
Fig. 12 is a modification of a portion of Fig. 11.

In Fig. 12 I show a modification of the total circuit illustrated in Fig. 11 wherein the portions of Fig. 11 below and to the right of terminals 90, 91 and mechanical connections 92, 93 are not duplicated in Fig. 12. There is a somewhat simplified recording system in which the amount of light falling on photo cells $P_1$ and $P_2$ controls the flow of current through $R_1$ and $R_2$ and consequently the grid voltage of tubes $V_1$ and $V_2$. If more light falls on $P_1$ than on $P_2$ then $V_1$ is made more conducting than $V_2$ and reactor T passes current to actuate the motor 18a. This circuit differs from that of Fig. 11 in that direct current voltage is applied to the anodes of the photo tubes $P_1$ and $P_2$ and to the plates of the amplifying tubes $V_1$ and $V_2$ which control the saturable reactors T and U.

It will be apparent that I have illustrated and described certain preferred embodiments of my invention but that I am not to be limited thereto as many substitutions of equivalent apparatus and circuits may be used without destroying the intent and novelty of my invention.

What I claim as new, and desire to secure by Letters Patent of the United States, is:

1. A balanceable electrical network including in combination, a reactor converter having means for converting a low-level direct current signal of reversible polarity into an amplified alternating current signal of reversible phase, a source of alternating current for the converter, a signal circuit including a source of low-level direct current and a connected resistor, electronic means selectively sensitive to the alternating current output signal of reversible phase, a reversible electric motor selectively actuated by said electronic means, means positioned by said electric motor to balance said network following an unbalance thereof caused by variation in said direct current signal, and a non-linear inverse feed-back circuit electrically energized from the output circuit of said electronic means and subjecting said resistor in the input circuit of said converter to a voltage modifying said low-level direct current signal.

2. The combination of claim 1 wherein said non-linear circuit includes a silicon carbide resistor having a high resistance when low voltage is applied across it and whose resistance decreases at a very rapid rate as said voltage is increased.

3. The combination of claim 1 wherein said non-linear circuit includes a copper oxide or similar type of polarizing resistor.

4. A balanceable electrical network including, in combination, a source of variable electromotive force to be measured, a motor adapted to operate in accordance with the magnitude of said force, means responsive to said magnitude operating to produce a control voltage for said motor, means positioned by said motor to balance said network following an unbalance thereof caused by a variation in said electromotive force, a resistor in circuit with said source producing said variable electromotive force, a feed back circuit energizing said resistor to oppose the electromotive force from said source and including a non-linear resistor subjected to said control voltage.

5. A system including means for producing a variable E. M. F. to be measured, a device having inertia and adapted to operate in accordance with the magnitude of said E. M. F., means responsive to the magnitude of said E. M. F. operating to control said device and producing a second E. M. F. varying in value with the operation of the device, means for introducing into the system from the second E. M. F. an E. M. F. opposing the E. M. F. to be measured, said last mentioned means including an element whose resistance varies with the E. M. F. applied thereto.

6. The system as defined in claim 4 in which the means to produce a control voltage for the motor comprises a pair of opposite A.-C. energized electron tubes each having a cathode load resistor, said first mentioned resistor being connected to shunt the cathode load resistor of the operating tube and said non-linear resistor being connected in the circuit between said cathode load resistor and the first mentioned resistor.

ANTHONY J. HORNFECK.

References Cited in the file of this patent

UNITED STATES PATENTS

| Number | Name | Date |
|---|---|---|
| 2,101,525 | Bartels | Dec. 7, 1937 |
| 2,113,436 | Williams | Apr. 5, 1938 |
| 2,302,893 | Roberts | Nov. 24, 1942 |
| 2,310,955 | Hornfeck | Feb. 16, 1943 |
| 2,358,103 | Ryder | Sept. 12, 1944 |
| 2,376,599 | Jones | May 22, 1945 |
| 2,401,168 | Kronenberger | May 28, 1946 |
| 2,409,610 | Bixby | Oct. 22, 1946 |
| 2,431,306 | Chatterjea et al. | Nov. 25, 1947 |
| 2,432,422 | Hornfeck | Dec. 9, 1947 |
| 2,446,563 | Upton | Aug. 10, 1948 |
| 2,561,747 | Merrill et al. | July 24, 1951 |